United States Patent
Primos et al.

(10) Patent No.: US 6,540,582 B1
(45) Date of Patent: Apr. 1, 2003

(54) MULTI-TOOL APPARATUS FOR FRICTION GAME CELLS

(75) Inventors: Wilbur R. Primos, Jackson, MS (US); James A. Primos, Jr., Madison, MS (US)

(73) Assignee: Primos, Inc., Flora, MS (US)

( * ) Notice: Subject to any disclaimer, the term of this patent is extended or adjusted under 35 U.S.C. 154(b) by 70 days.

(21) Appl. No.: 09/619,099

(22) Filed: Jul. 19, 2000

(51) Int. Cl.$^7$ ................................................. A63H 5/00
(52) U.S. Cl. ........................ 446/418; 446/397; 451/491; 451/493; 451/524; 451/525
(58) Field of Search ................ 446/418, 397; 451/461, 490, 491, 492, 493, 523, 524, 525; 7/170; 15/105, 106, 111, 229.13; 132/311, 310

(56) References Cited

U.S. PATENT DOCUMENTS 2,025,181 A * 12/1935 Simon ........................ 446/397
4,988,325 A * 1/1991 Alderson et al. ............ 446/397
5,178,575 A * 1/1993 Koch .......................... 446/397
6,210,252 B1 * 4/2001 Anderson ................... 446/397

OTHER PUBLICATIONS

H.S. Strut Call Conditioner, Model 00893, manufactured by Hunter's Specialties, date unknown.

* cited by examiner

Primary Examiner—Derris H. Banks
Assistant Examiner—Urszula M Cegielnik
(74) Attorney, Agent, or Firm—Holland & Hart

(57) ABSTRACT

A multi-tool apparatus for friction game calls includes a main body sized to house at least three surface treatment implements. The surface treatment implements may include a stone, a diamond surface, an abrasive pad, chalk, and a lined cavity for conditioning and cleaning elongate structures, such as strikers for slate-type calls. The multi-tool apparatus is intended to be transported in the field by the hunter for conditioning and cleaning all types of friction game calls.

27 Claims, 2 Drawing Sheets

MULTI-TOOL APPARATUS FOR FRICTION GAME CELLS

TECHNICAL FIELD

This invention relates to game calls, and more particularly to implements used to condition and clean sound-producing surfaces used in friction game calls.

BACKGROUND OF THE INVENTION

Game calls that require some type of friction between two structural elements to generate sounds of game animals come in many different types and sizes. These calls, which are collectively referred to below as friction game calls, have existed for many years. Some of these friction game calls include, without limitation, slate-type calls (i.e., game calls that include a striker and a flat, usually disk-shaped surface (made of slate, crystal, aluminum, stainless steel, titanium, or any other suitable material) to generate the desired sounds), box calls, squawk box type calls, antlers (real and synthetic) for simulating antler rattling, and all other types of game calls that rely upon friction of some type.

A constant problem associated with these friction game calls relates to the need to maintain clean and appropriately textured the sound-producing surfaces and the structures used to contact these surfaces to generate the desired friction, and thus the proper sounds.

Traditionally sandpaper has been used to etch and clean surfaces of slate-type calls. One problem associated with using sandpaper, however, is that it is too abrasive and will remove too much of the sound-producing material. In addition, the sandpaper itself wears out in a relatively short period of time and can be difficult to use for even and effective conditioning. Abrasive pads have also been used to clean and condition friction game calls. Such abrasive pads, such as green abrasive pads sold by 3M Company used primarily for dish washing, have been used to condition game calls. These type of abrasive pads are used to remove dirt, oil, and perhaps some of the sound-producing material from the sound-producing surface. Abrasive pads take off little, if any, of the sound-producing material, and thus can be used regularly on sound-producing surfaces.

Commonly, hunters are required to clean friction game calls in the field. In addition, hunters may use many different types of calls when hunting a particular game species. Often, it may be necessary to use one or more types of implements to clean effectively the surface of a particular sound-producing material. These implements may include a stone (e.g., a stone similar to a knife sharpening stone) or a diamond surface (e.g., a diamond-coated surface similar to a diamond steel used to sharpen knives). Still further, a need may exist to utilize an abrasive pad, such as described above, to clean oil and other debris from the sound-producing surface.

Chalk is also used to condition surfaces of friction game calls. For example, wooden box calls are commonly used for calling wild turkeys. Wild turkey sounds are created by dragging a lid of a box call across a top edge of one of the vertical walls of the box. Over time, the surfaces can become worn and shiny from repeated use and need to be reconditioned. Chalk applied to the friction-generating surfaces can appropriately recondition the engaging surfaces so that the appropriate friction and thus desired sounds can be produced.

Attempts have been made to provide hunters in the field with more than one implement for cleaning friction game calls. One such product is currently manufactured by Hunter's Specialties under the name "Call Conditioner." The Call Conditioner includes, however, only two implements for cleaning friction game calls. The first is a stone, which is secured to a distal end of a plastic handle. The other is an abrasive pad positioned inside a trough-shaped well formed in the plastic handle. The abrasive pad is provided for the express purpose of cleaning the tip of a striker used on slate-type calls to generate desired sounds. The Call Conditioner of Hunter's Specialties is limited, however, in that it is for slate-type calls only and does not provide numerous implements that may be needed by the hunter for appropriate surface conditioning and cleaning of various types of friction game calls in the field.

In view of the foregoing, there is a need to provide a multi-tool device that better satisfies the needs of hunters when using friction game calls in the field.

OBJECTS AND SUMMARY OF THE INVENTION

It is a primary object of the present invention to provide a tool which comprises a plurality of implements used to clean and condition sound-producing surfaces of friction game calls.

Another object of the present invention is to provide a tool comprising at least three implements used to clean and condition sound-producing surfaces of friction game calls.

Another object of the invention is to provide a tool comprising a generally cylindrical cavity lined with an abrasive material to clean and condition the working end of a striker used for slate-type calls.

Another object of the invention is to provide a storage location for a surface treatment implement, such as chalk, used to condition friction game calls.

Still another object of the present invention is to provide a tool for cleaning and conditioning friction game calls which can be efficiently and effectively grasped by a hunter in the field and which can be utilized to apply appropriate pressure on the friction game call sound-producing surface to produce the desired cleaning and conditioning.

Yet another object of the present invention is to provide a hand-held tool used to clean and condition friction game calls which utilizes as many as five different implements for cleaning and conditioning sound-producing surfaces of friction game calls, and which can be conveniently and easily carried in the field by hunters.

A multi-tool apparatus for friction game calls comprises a main body having a handle, a distal end, and a proximal end. A first surface treatment implement in the form of a stone (e.g., a stone similar to a type of stone used as a grinding wheel used to grind metal and other hard materials), is attached to the distal end of the multi-tool apparatus. A second surface treatment implement in the form of a diamond surface (e.g., a diamond coated surface similar to what is found on a diamond steel used to sharpen knives) is coupled to another, opposite side of the distal end of the multi-tool apparatus. Still further, a surface conditioning implement such as a piece of chalk is held inside a cavity formed in the handle portion of the multi-tool apparatus. Still another surface treatment implement in the form of a rolled up abrasive pad is used as a plug to hold the chalk inside the cavity. The abrasive pad can be removed and used as necessary to condition and clean sound-producing surfaces. Finally, a cylindrical cavity lined with an abrasive pad is provided in the multi-tool apparatus to clean and condition the striker of a slate-type call.

Other objects, features, and advantages of the invention will become apparent from the following detailed description of the invention with reference to the accompanying drawings.

BRIEF DESCRIPTION OF THE DRAWINGS

Preferred embodiments of the invention are described below with reference to the accompanying drawings.

DETAILED DESCRIPTION OF THE INVENTION

The present invention relates to a multi-tool apparatus 10 for friction game calls. As discussed above, the terms "friction game calls" include any type of game call where two structural elements contact each other and generate friction to produce sounds that simulate the sounds made by game animals.

Figure 1:
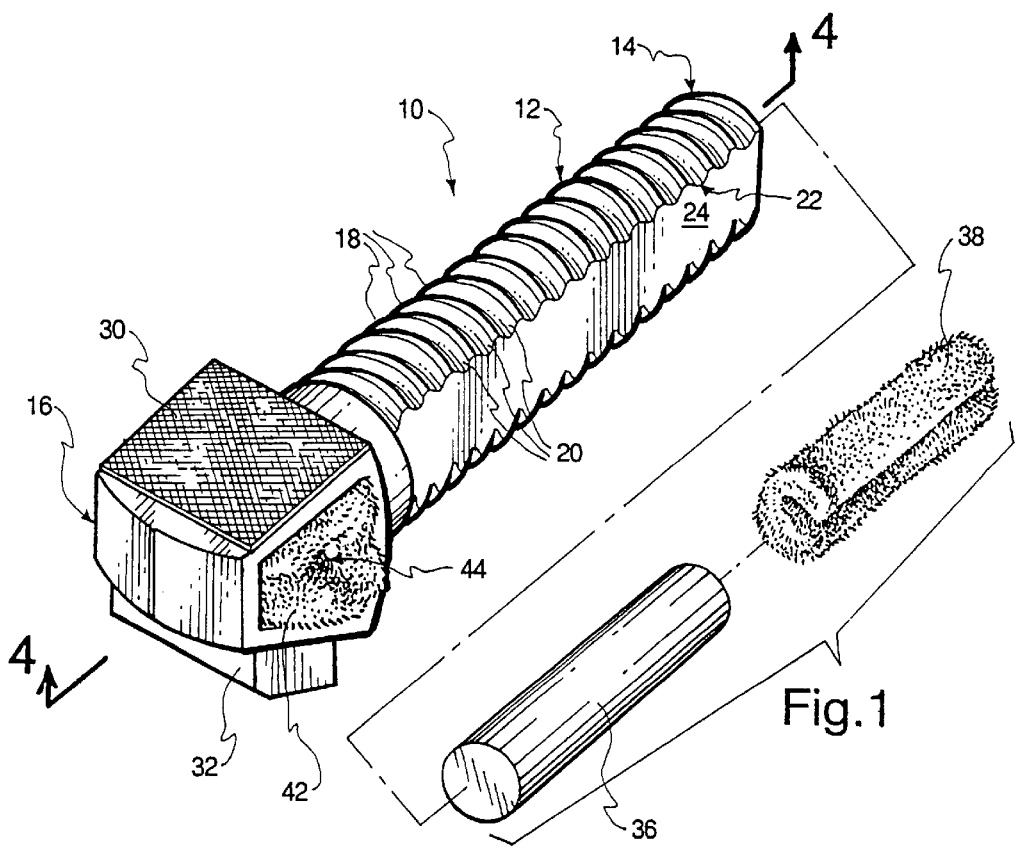
FIG. 1 is an exploded perspective view of a multi-tool apparatus for friction calls according to the present invention.
Figure 2:
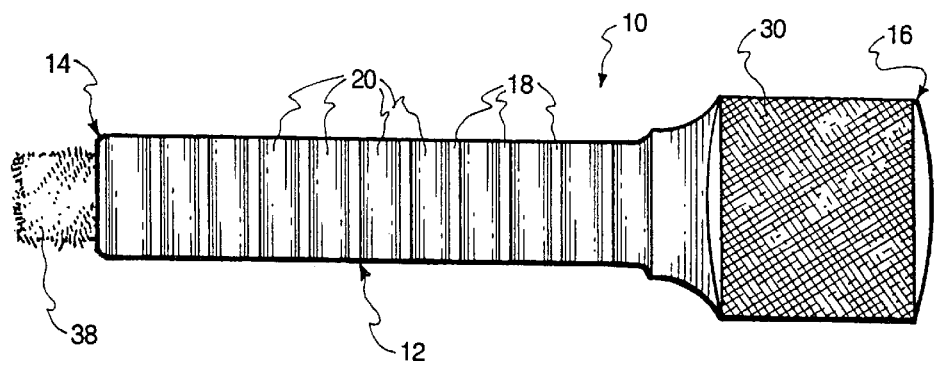
FIG. 2 is a top view of the multi-tool apparatus of FIG. 1 showing the diamond surface.

The multi-tool apparatus 10 comprises a main body 12 defining a proximal end 14 and a distal end 16. A handle portion is formed on the main body 12 toward the distal end 14. As shown in FIGS. 1 and 2, the handle comprises an irregular outside surface, preferably in the form of a plurality of alternating ribs 18 and indentations or necked-down areas 20 on two opposite sides of the main body 12. The ribs 18 and indentations 20 form opposed gripping surfaces on opposed sides of the handle portion, specifically on the top and bottom sides of the handle. Opposed planar surfaces 24 are formed on the main body 12 adjacent the ridged sides with the ribs 18 and indentations 20. Preferably the main body 12 is made of injection molded plastic, but could be made from any suitable material.

A first surface treatment implement in the form of a diamond surface 30 is coupled to the distal end of the main body 12. As shown, the diamond surface 30 is rectangular in shape and preferably angled relative to the longitudinal axis of the main body. The angled orientation of the diamond surface allows for better contact between the diamond surface 30 and the sound-producing surface being conditioned. Any desired angle can be used. Those skilled in the art will understand that the angle, orientation, and size of the diamond surface can vary without departing from the scope of the present invention. The diamond surface 30 is intended to be used to etch, condition, and clean relatively hard sound-producing surfaces.

Figure 3:
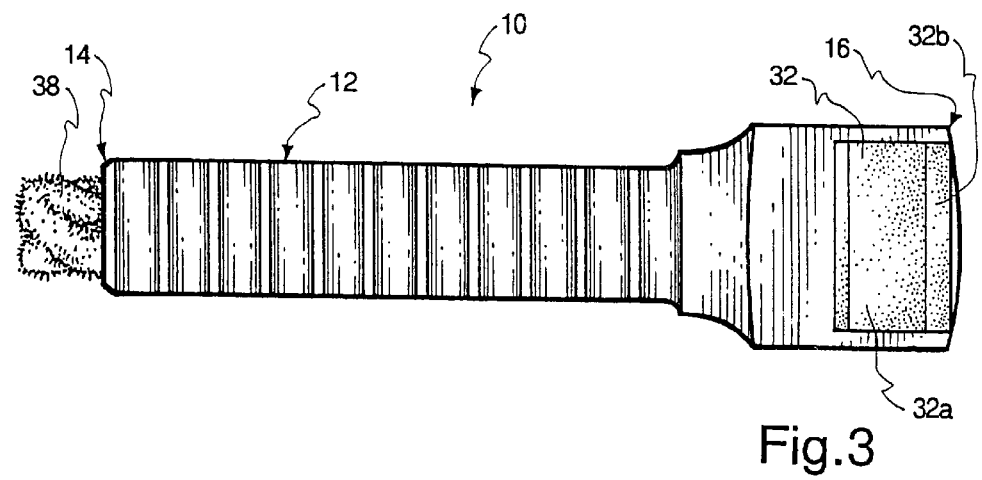
FIG. 3 is a bottom view of the multi-tool apparatus of FIG. 1 showing the stone surface.

FIGS. 1 and 3 show a second surface treatment implement in the form of a stone 32, preferably made from a type of stone used for conventional grinding wheels, coupled to the distal end of the main body 12 opposite the diamond surface 30. As shown in FIG. 3, the stone 32 includes two primary conditioning surfaces: a first stone surface 32a which is inclined relative to the longitudinal axis of the main body 12 and a second stone surface 32b which forms a greater acute angle relative to the longitudinal axis of the main body 12 as compared to the angle formed by surface 32a. Surface 32b is formed toward the fore or lead end 16 of the multi-tool apparatus 10 to allow for effective etching, conditioning, and cleaning of sound-producing surfaces. Any desired angles can be used to orient surfaces 32a and 32b. The stone 32 is relatively thick (particularly compared to the diamond surface 30) and will last for many uses. The various aspects of the stone 32 render the stone 32 suitable for use with respect to many different sound-producing surfaces of many different sizes, shapes, and configurations.

Figure 4:
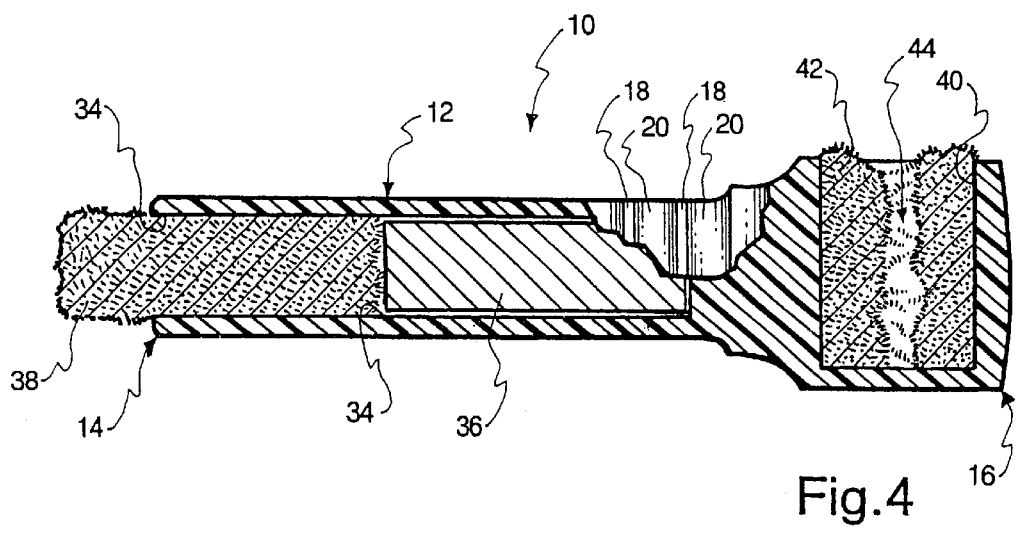
FIG. 4 is a section view, taken along the line 4—4 of FIG. 1, of the multi-tool apparatus showing the two cavities, a first cavity for holding a surface treatment implement such as a piece of chalk and a second cavity lined with an abrasive pad for cleaning an end of a striker for a slate-type call.

FIG. 4 shows a first container or cavity 34 formed in the handle portion of the main body 12. The first cavity 34 is sized to hold a surface treatment implement, such as without limitation a piece of chalk 36. Those skilled in the art will understand that any type of surface treatment implement can be appropriately sized and held within the cavity 34. In a preferred embodiment, the piece of chalk 36 is held within cavity 34 by means of a plug 38, which preferably comprises a rolled up abrasive pad (yet another surface treatment implement), such as a green abrasive pad manufactured by 3M Company commonly used to clean dishes. The abrasive pad 38 can be unrolled and used to condition and clean virtually any type of sound-producing surface. The flexibility and formability of the pad 38 renders the pad 38 particularly suitable for odd-shaped and small sound-producing surfaces. The pad 38 is particularly suitable for cleaning debris and oils (from the hands of the users of the game calls) left on the sound-producing surfaces. In the embodiment shown in FIG. 4, the first cavity 34 is cylindrical in shape, but it is to be understood that any suitable cavity shape may be utilized without departing from the scope of the present invention.

The multi-tool apparatus 10 further comprises a second cavity 40 lined with a surface treatment implement in the form of an abrasive material 42. The lining which constitutes an abrasive material or pad 42 is attached to the inside wall of the cavity 40 to create a lined cavity or pocket 44. Any suitable fastening mechanism, including without limitation a suitable adhesive, may be used to secure the abrasive lining 42 inside the cavity 40. The resulting lined cavity 40 is generally in the form of a cylindrical cavity. The cavity 40 can be used to receive any elongate structure used with friction game calls, including without limitation a striker for slate-type calls or any other elongate structure. Preferably, the elongate structure is inserted into the lined pocket or cavity 40 and moved by twisting or inserting and removing the elongate structure relative to the pocket or cavity 40 to condition and clean the sound-producing surface of the elongate structure.

In operation, the multi-tool apparatus according to the present invention will serve as a highly efficient, effective way for a hunter in the field to clean friction game calls. The multi-tool apparatus 10 is a hand-held device, which can easily fit inside of a pocket, fanny pack, or other pouch and carried-by the hunter in the field. In one embodiment, a preferred length of the multi-tool apparatus 10 will be less than five inches. While the hand-held tool is small, it is sufficiently rigid (because of the plastic main body 12) so that pressure can be applied to the particular sound-producing surface being conditioned and cleaned.

A hunter desiring to utilize the multi-tool apparatus 10 may wish to utilize the diamond surface 30 to clean and condition sound-producing surfaces such as without limitation glass, crystal, and other hard surfaces. The stone 32 may be used to clean and condition surfaces such as without limitation aluminum, glass, crystal, and ceramic. Because the stone is relatively thick, it will last a significant period of time. The rolled up pad 38 serves as a cork to hold the chalk 36 inside the first cavity 34. The abrasive pad, 38 can be opened up, flattened, and used to clean and condition all surfaces. Frequently, oil from a person's hand or some other type of debris will appear on a sound-producing surface. The abrasive pad can be used to clean the surface of the sound-producing material without removing much, if any, of the sound-producing material. In particular, the abrasive pad 38 is particularly suitable to clean and condition a slate surface.

The striker aperture 42 can be used to clean and condition strikers used on slate-type calls. Often strikers will fall on the ground or become oily and dirty from a person's hand. By inserting the striker into the cavity 44 lined with the abrasive material 42, and by rotating and moving the striker while inside of the aperture, the striker can be cleaned and conditioned quickly and efficiently.

If chalk is needed, as discussed above with respect to wooden box-type calls, the chalk 36 can be removed from cavity 34 and utilized, after which it can be replaced and stored with the multi-tool apparatus 10. As mentioned, any other suitably sized surface treatment implement may be held within cavity 34.

In compliance with the statute, the invention has been described in language more or less specific as to structural and methodical features. It is to be understood, however, that the invention is not limited to the specific features and methods shown and described, since the present description comprises preferred forms and methods of putting the invention into effect. The invention is, therefore, claimed in any of its forms or modifications with the proper scope of the appended claims appropriately interpreted in accordance with the doctrine of equivalents.

What is claimed is:

1. A multi-tool apparatus for friction game calls, comprising:
   a main body having a length, the main body being structured to house a plurality of implements used to condition sound-producing surfaces of a friction game call;
   a first surface treatment implement housed by the main body;
   a second surface treatment implement housed by the main body;
   a third surface treatment implement housed by the main body.

2. A multi-tool apparatus for friction game calls according to claim 1 wherein the first surface treatment implement comprises a stone.

3. A multi-tool apparatus for friction game calls according to claim 1 wherein the first surface treatment implement comprises a stone and the second surface treatment implement comprises a diamond surface.

4. A multi-tool apparatus for friction game calls according to claim 1 wherein the first surface treatment implement comprises a stone, the second surface treatment implement comprises a diamond surface, and the third surface treatment implement comprises an abrasive pad.

5. A multi-tool apparatus for friction game calls according to claim 1, further comprising fourth surface treatment implement.

6. A multi-tool apparatus for friction game calls according to claim 1, further comprising a fourth surface treatment implement, wherein the fourth surface treatment implement comprises chalk.

7. A multi-tool apparatus for friction game calls according to claim 1 wherein the first surface treatment implement, the second surface treatment implement, and the third surface treatment implement are taken from the group consisting of a stone, a diamond steel, an abrasive pad, and chalk.

8. A multi-tool apparatus for friction game calls according to claim 1, further comprising:
   a cavity formed in the main body;
   wherein one of the first, the second, or the third surface treatment implement is held within the cavity.

9. A multi-tool apparatus for friction game calls according to claim 8, further comprising a removable plug to hold the one of the first, the second, or the third surface treatment implement within the cavity.

10. A multi-tool apparatus for friction game calls according to claim 8, further comprising a removable plug to hold one of the first, the second, or the third surface treatment implement within the cavity, wherein the removable plug comprises a rolled up abrasive pad.

11. A multi-tool apparatus for friction game calls according to claim 1, further comprising an irregular outside surface formed on the main body for improved gripping of the multi-tool apparatus.

12. A multi-tool apparatus for friction game calls according to claim 1, further comprising a cavity formed in the main body, an additional surface treatment implement being held within the cavity, the cavity being configured to receive an end of a striker used in connection with friction game calls to condition the striker.

13. A multi-tool apparatus for friction game calls according to claim 1, further comprising a cavity formed in the main body, the cavity being at least partially lined with an abrasive material, the cavity being configured to receive an end of a striker used in connection with friction game calls to condition the striker.

14. A multi-tool apparatus for friction game calls, comprising:
   a main body having a length, the main body being configured to be hand held, the main body of the multi-tool apparatus being structured to hold a plurality of implements used to treat sound-producing surfaces of a friction game call;
   at least three different surface treatment implements held by the main body.

15. A multi-tool apparatus for friction game calls according to claim 14 wherein one of the surface treatment implements comprises a stone.

16. A multi-tool apparatus for friction game calls, comprising:
   a main body having a length, the main body being configured to be hand held, the main body of the multi-tool apparatus being structured to hold a plurality of implements used to treat sound-producing surfaces of a friction game call;
   at least three different surface treatment implements held by the main body wherein one of the surface treatment implements comprises a stone, and another of the surface treatment implements comprises a diamond surface.

17. A multi-tool apparatus for friction game calls according to claim 16 wherein another of the surface treatment implements comprises a diamond surface, and another of the surface treatment implements comprises an abrasive pad.

18. A multi-tool apparatus for friction game calls, comprising:
   a main body having a length, the main body being configured to be hand held, the main body of the multi-tool apparatus being structured to hold a plurality of implements used to treat sound-producing surfaces of a friction game call;

at least three different surface treatment implements held by the main body, further comprising a fourth surface treatment implement held by the main body.

19. A multi-tool apparatus for friction game calls according to claim 18 wherein the fourth surface treatment implement held by the main body, wherein the fourth surface treatment implement comprises chalk.

20. A multi-tool apparatus for friction game calls according to claim 14 wherein the at least three surface treatment implements are taken from the group consisting of a stone, a diamond steel, an abrasive pad, and chalk.

21. A multi-tool apparatus for friction game calls, comprising:

a main body having a length, the main body being configured to be hand held, the main body of the multi-tool apparatus being structured to hold a plurality of implements used to treat sound-producing surfaces of a friction game call;

at least three different surface treatment implements held by the main body, further comprising:

a cavity formed in the handle of the main body;

wherein one of the surface treatment implements is held inside the cavity.

22. A multi-tool apparatus for friction game calls according to claim 21, further comprising a removable plug to hold the one of the surface treatment implements inside the cavity.

23. A multi-tool apparatus for friction game calls according to claim 21, further comprising a removable plug to hold the one of the surface treatment implements inside the cavity, wherein the removable plug comprises a rolled up abrasive pad.

24. A multi-tool apparatus for friction game calls according to claim 14, further comprising an irregular outside surface formed on the main body for improved gripping of the multi-tool apparatus.

25. A multi-tool apparatus for friction game calls, comprising:

a main body having a length, the main body being configured to be hand held, the main body of the multi-tool apparatus being structured to hold a plurality of implements used to treat sound-producing surfaces of a friction game call;

at least three different surface treatment implements held by the main body, further comprising a cavity formed in the main body, another surface treatment implement being held by the cavity, the cavity being configured to receive an end of a striker used in connection with friction game calls to condition the striker.

26. A multi-tool apparatus for friction game calls, comprising:

a main body having a length, the main body being configured to be hand held, the main body of the multi-tool apparatus being structured to hold a plurality of implements used to treat sound-producing surfaces of a friction game call;

at least three different surface treatment implements held by the main body, further comprising a cavity formed in the main body, the cavity being at least partially lined with an abrasive material, the cavity being configured to receive an end of a striker used in connection with friction game calls to condition the striker.

27. A method of using a multi-tool apparatus for friction game calls, comprising:

providing a main body having a length, the main body being structured to house a plurality of implements used to treat sound-producing surfaces of a friction game call;

providing a first surface treatment implement housed by the main body;

providing a second surface treatment implement housed by the main body;

providing a third surface treatment implement housed by the main body;

using one of the first, the second, or the third surface treatment implements to treat a sound-producing surface of a game call.

* * * * *

UNITED STATES PATENT AND TRADEMARK OFFICE
CERTIFICATE OF CORRECTION

PATENT NO.     : 6,540,582 B1
DATED          : April 1, 2003
INVENTOR(S)    : Wilbur R. Primos and James A. Primos, Jr.

It is certified that error appears in the above-identified patent and that said Letters Patent is hereby corrected as shown below:

<u>Title page, Item [54] and Column 1, line 2,</u>
Title, "CELLS" should be -- CALLS --.

Signed and Sealed this

Tenth Day of June, 2003

JAMES E. ROGAN
*Director of the United States Patent and Trademark Office*